United States Patent [19]
Shindler

[11] 3,944,346
[45] Mar. 16, 1976

[54] POLARIZING SPECTACLES
[75] Inventor: Anthony Shindler, Brookline, Mass.
[73] Assignee: American Optical Corporation, Southbridge, Mass.
[22] Filed: Nov. 20, 1974
[21] Appl. No.: 525,542

[52] U.S. Cl. .................................. 351/49; 350/159
[51] Int. Cl.² ........................ G02C 7/12; G02B 5/30
[58] Field of Search ............... 351/49; 350/156, 159

[56] References Cited
UNITED STATES PATENTS

| | | | |
|---|---|---|---|
| 2,688,900 | 9/1954 | Silverman | 351/49 |
| 3,371,979 | 3/1968 | Catanzaro | 351/49 |

FOREIGN PATENTS OR APPLICATIONS

| | | | |
|---|---|---|---|
| 510,245 | 1/1955 | Italy | 351/49 |
| 984,277 | 2/1951 | France | 351/49 |

*Primary Examiner*—Paul A. Sacher
*Attorney, Agent, or Firm*—H. R. Berkenstock, Jr.; William C. Nealon

[57] ABSTRACT

Spectacles having a face-formed readily separable two-section eyeglass frame front wherein a first forward section of the frame front supports a pair of fixed non-circular light-polarizing lenses and a rearward second section supports a rotatable light-polarizing lens in alignment with each forwardly disposed lens. A manually operable rear lens rotating mechanism is provided for selectively rotating the two rearward lenses in unison to simultaneously equally rotationally alter the orientation of axes of polarization of these lenses relative to axes of polarization of the fixed forwardly disposed lenses for correspondingly varying the intensity of light permitted to pass through each system of front and rear lenses of the spectacles.

8 Claims, 7 Drawing Figures

POLARIZING SPECTACLES

FIELD OF THE INVENTION

This invention relates to spectacles and more particularly to variable density light-polarizing sunglasses.

BACKGROUND OF THE INVENTION

Hitherto, variable density spectacles which incorporate systems of rotatable light-polarizing lenses have been attended with serious problems of either undue mechanical complexity or oversimplification of structure to the extent of inefficaciousness.

Exemplary of prior art complexity in variable density spectacle structures are those of U.S. Pat. Nos. 1,879,793 and 2,380,481 wherein worm and segment gearing of the former and/or worm and ring gearing of the latter render such structures not only difficult and expensive to manufacture and unduly cumbersome, heavy and uncomfortable upon the face but unadaptable to face-forming for improved fitting and/or styling necessary for general public acceptance of such items as dress spectacles (sunglasses) rather than as necessary industrial or military eye protective devices.

Cases of oversimplicity rendering prior art variable density spectacles inefficacious are exemplified by U.S. Pat. Nos. 2,005,426 and 2,773,422 wherein there is a lack of means for coordinating the rotation of right and left eye spectacle lenses when adjusting the spectacles for continuously variable density effects. Detenting of the single lens rotations to preselected positions of use as disclosed in U.S. Pat. No. 2,773,422, for example, limits such use to preselected widely different degrees of density (light-transmission). On the other hand, freely independently rotatable single lenses according to U.S. Pat. No. 2,005,426 render the achievement of identical right and left eye lens densities extremely difficult and awkward. A smooth and continuous uniform transition in both right and left eyes from low to high density or vice versa is virtually impossible.

In connection with the aforementioned matter of publically acceptable aesthetics in variable density spectacle design, which is of extreme importance in the manufacture of dresswear items (e.g. sunglasses), U.S. Pat. Nos. 2,251,330 and 2,298,058 illustrate types of structure which are inadaptable to other than ordinary circular lenses. The flat circular lens has long been outmoded and is, with but few exceptions, publically unacceptable in dress spectacles. Additionally, frame front coquilling, i.e. bending or shaping according to the general transverse shape of a wearer's face for achieving wearing comfort and optimum fitting appearance is unattainable with structures of the aforesaid exemplary type. Such bending would interfere with useful operation of their lens rotating mechanisms.

The prior art inability or unadaptability to coquilling for face-fitting comfort and improved appearance is more clearly evident in frame front structures of the types shown in U.S. Pat. Nos. 2,813,459 and 3,371,979. While the adaptation of non-circular front lenses in these structures relieves, to some extent, the unattractiveness of old art circular lens shapes, the overall aesthetics of meniscus lenses and frame coquilling for fitting comfort necessary to achieve general public acceptance of variable density spectacles, especially as dresswear, is lacking.

Accordingly, it is a principal object of the present invention to provide such improvements in variable density spectacle construction as to overcome the aforementioned and corollary drawbacks of the prior art devices and wherewith aesthetically acceptable and mechanically dependable variable density dress spectacles may be simply, efficiently and economically produced.

SUMMARY OF THE INVENTION

Objectives of the present invention are accomplished by the provision of uniquely designed light-weight face-forward variable density spectacles of current dresswear styling and which are readily adaptable to modifications for compliance with styling trends of the art.

More specifically, the invention provides a cast, molded, pressed or otherwise formed lightweight spectacle frame front in the form of a readily separable two-part structure. A forward section of the structure supports a pair of aesthetically non-circularly shaped right and left eye meniscus light-polarizing lenses having their respective axes of polarization aligned parallel to each other and fixed. A second rearward section of the frame front supports a pair of right and left eye circularly shaped meniscus light-polarizing lenses arranged to become aligned with corresponding right and left eye lenses of the forward section of the frame front when the two sections are assembled for use.

Disassembly and reassembly of the front and rearward sections may be quickly and easily accomplished for ready and easy cleaning of any one or more of the lenses of the spectacle system.

A unique one-piece wire-like lens rotating mechanism, being readily laterally flexible in all directions, interconnects the rotatable lenses of the spectacle wherewith these lenses may be easily manually rotated in unison relative to the fixed lenses of the system for continuously equally varying the density of each right and left eye dual lens system (i.e. varying the intensity of light permitted to pass therethrough). This flexible lens rotating mechanism permits the coquilling of the frame front, i.e. bending or shaping to a face form configuration for accurate and comfortable fitting, without interference of its smooth operation.

The foregoing and various additional objects and advantages of the invention will become apparent from the following description when taken in conjunction with the accompanying drawings.

DESCRIPTION OF THE PREFERRED EMBODIMENTS

Figure 1:
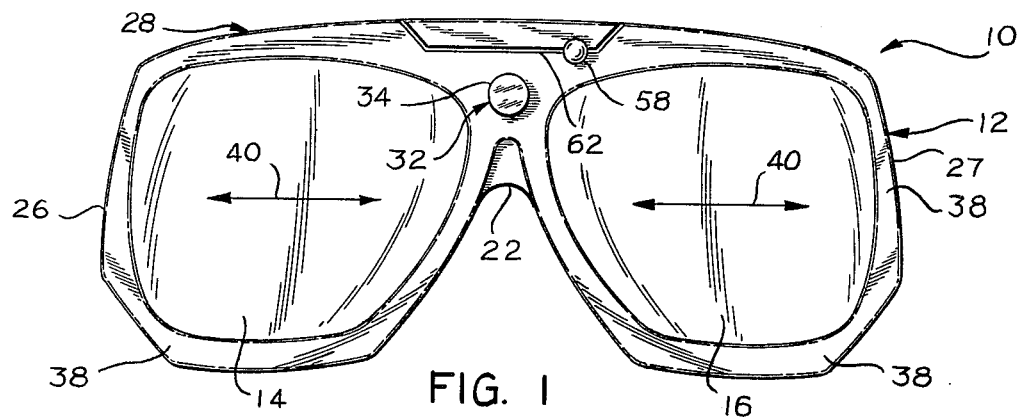
FIG. 1 is a front elevational view of a preferred embodiment of the invention.
Figure 2:
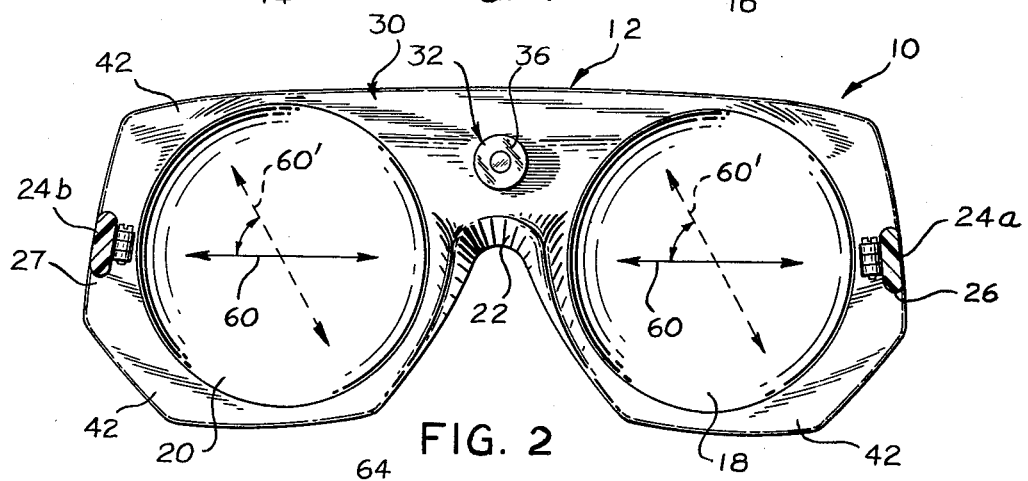
FIG. 2 is a rear elevational view of the variable density spectacles shown in FIG. 1.

Spectacles 10 of the present invention comprise an eyeglass frame front 12 supporting a forwardly disposed pair of fixedly mounted right and left eye light-polarizing lenses 14 and 16 respectively (FIG. 1) and a pair of juxtapositioned rearwardly disposed right and left eye light-polarizing lenses 18 and 20 (FIG. 2).

In this embodiment of the invention, frame front 12 includes a saddle-type bridge portion 22 adapted to seat upon the nose of a wearer to support the frame front in a position of use before the wearer's eyes. Spectacle temples 24a and 24b, hinged to right and left endpieces 26 and 27 respectively of frame front 12, are provided to conventionally secure the spectacles 10 in a position of use.

It should be understood that the saddle-type bridge 22 which is shown herein for purposes of illustration may be modified to incorporate guard arms and nose pads similar to those shown in FIG. 1 of the aforementioned U.S. Pat. No. 2,773,422 and/or those of the type shown in FIG. 4 of U.S. Pat. No. 1,879,793, if desired. Furthermore, and alternatively, wide temples similar to those shown in the embodiment of the invention of U.S. Pat. No. 3,371,979 may be substituted for temples 24a and 24b of the present invention.

Referring more particularly to constructional details of frame front 12 wherein lies the crux of the present invention, it can be seen more particularly in FIGS. 3–7 that this front 12 is face-formed by a bend in its bridge section which displaces endpieces 26 and 27 rearwardly of bridge 22. Thus, spectacles 10 are rendered readily attractively and comfortably fitted to the intended wearer.

The face-formed eyeglass front 12 comprises an assembly of juxtapositioned forward and rear sections 28 and 30 respectively which are secured together with a fastener 32. Fastener 32 may comprise a threaded screw 34 and nut 36 or, alternatively, be a snap fastener or any mechanical equivalent of either of these exemplary devices. In all cases, however, fastener 32 is intended to be readily disconnectable so that the forward and rear sections 28 and 30 of frame front 12 may be simply and easily separated from one another for purposes of on-the-spot cleaning and/or replacement of damaged lenses.

Lens rims 38 of the forward section 28 are internally grooved to intimately fixedly receive and support non-circular light-polarizing lenses 14 and 16 with their respective axes of polarization parallel to each other, e.g. in the directions illustrated by double-headed arrows 40 (FIG. 1).

All reference made herein to "axes of polarization" are intended to be interpreted as meaning the transmission axes of the particular lenses being referred to, i.e. the axes or directions parallel to which vibrations of light will pass through or be transmitted by the lens while light vibrating perpendicularly thereto will not. It should be understood that lenses being partially polarizing yet absorptive to certain preselected wavelength bands or colors and/or being completely transmissive to certain wavelength bands or colors while polarizing to others are also contemplated for use with and/or as being adaptable to the present spectacles. The present invention contemplates the use of any and all types of light-polarizing lenses and combinations thereof which may be used in juxtapositioned pairs, i.e. wherein one lens of each pair may be rotated relative to the other for varying the amount or intensity of light permitted to pass through the pair according to principles well-known and understood in the art. Those interested in greater details of the operation of light-polarizing lenses may refer to the afore-mentioned U.S. Pat. Nos. 1,879,793; 2,380,481; 2,005,426; 2,773,422; 2,251,330; and 2,298,058.

Figure 3:
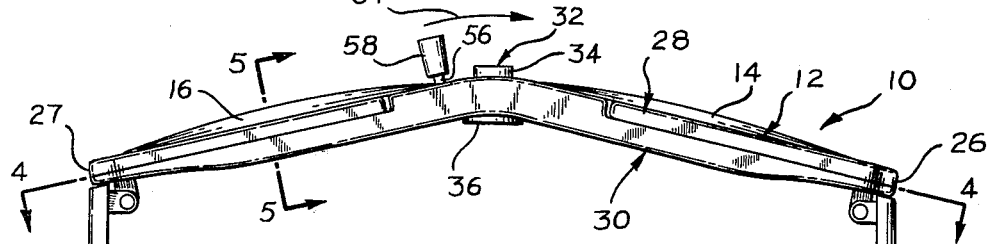
FIG. 3 is a top plan view of the spectacles shown in FIGS. 1 and 2.
Figure 7:
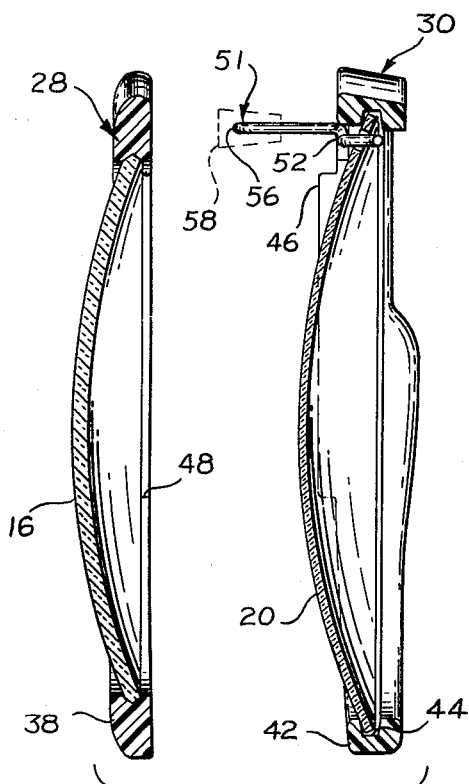
FIG. 7 is a side elevational view of the presently illustrated embodiment of the invention.

It can be seen more particularly in FIGS. 3 and 7 that frame front 12 is face-formed by a bend in its bridge section which displaces the opposite lens supporting parts thereof rearwardly for face-fitting accuracy and comfort. This further enhances the general appearance of spectacle 10 wherewith in combination with its lightness in weight and lens styling, it is rendered readily acceptable and desirable as dresswear spectacles (sunglasses).

All lenses 14, 16, 18 and 20 are meniscus rather than flat as has been necessitated by prior art spectacle construction. This incorporation of menisus lenses overcomes problems of unattractive and annoying reflections of light from a wearer's spectacles into the eyes of others as is common in all eyewear incorporating flat or nearly flat eyeglass lenses. The present meniscus lenses, accordingly, enhance the aesthetics of the present spectacle structure and further make possible the incorporation of prescription-type lenses as forward lenses 14 and 16. Thus, with a wearer's visual defficiencies compensated for by lens curvature corrections incorporated in the light-polarizing forward lenses 14 and 16, spectacles 10 may be used as variable density corrective eyewear.

Front and rear sections 28 and 30 may be molded, cast, milled or otherwise formed to the illustrated configurations and may be constructed of any one or more of the various well-known resins or plastics commonly used in the manufacture of conventional spectacles. The use of metal, preferably of a lightweight type such as aluminum, is also contemplated.

Rear section 30 of spectacle 10 which supports lenses 18 and 20 has its lens rims 42 (FIGS. 2, 4, 5 and 6) internally grooved to receive and support lenses 18 and 20. Grooves 44 in these lens rims are shaped to permit free rotation of lenses 18 and 20 therewithin.

Figure 6:
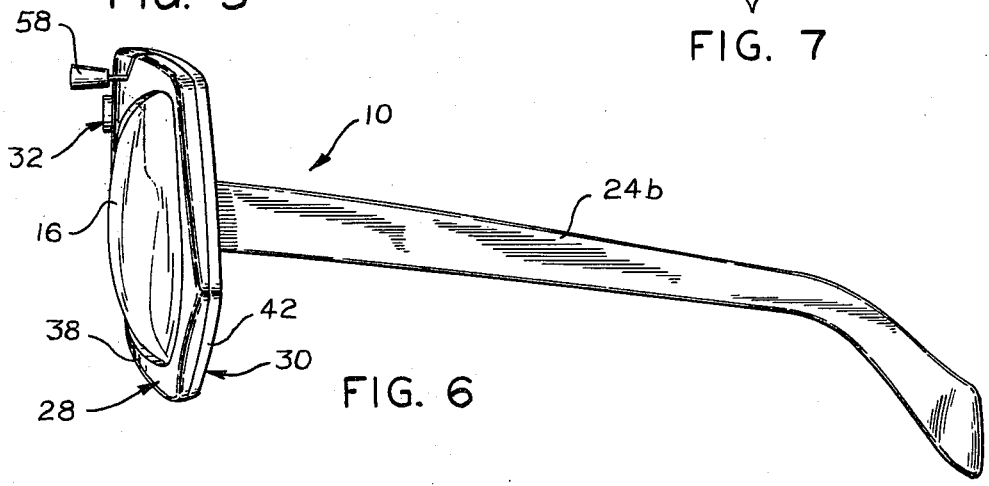
FIG. 6 is a view similar to FIG. 5 but with parts thereof shown in a separated relationship for ease and clarity in depicting details of the spectacles frame construction.

Protrusions 46 (FIGS. 4 and 7) are adapted to interfit with correspondingly shaped recesses 48 in front section 28 and function as keys to establish and maintain an aligned relationship of lenses 14–18 and 16–20 when sections 28 and 30 are assembled as in FIGS. 1–2 and 6. Protrusions and receiving recesses of other shapes and at other positions (e.g. on the endpieces) of frame sections 28 and 30 may, alternatively, be used to key sections 28 and 30 together.

Figure 4:
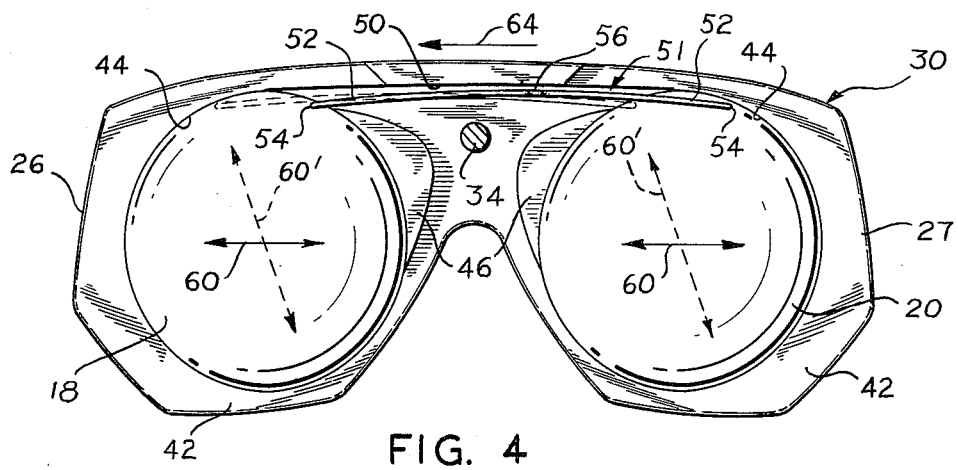
FIG. 4 is a view taken generally along line 4—4 of FIG. 3 looking generally in the direction of the arrows and wherewith a forward portion of the spectacles frame is removed.
Figure 5:
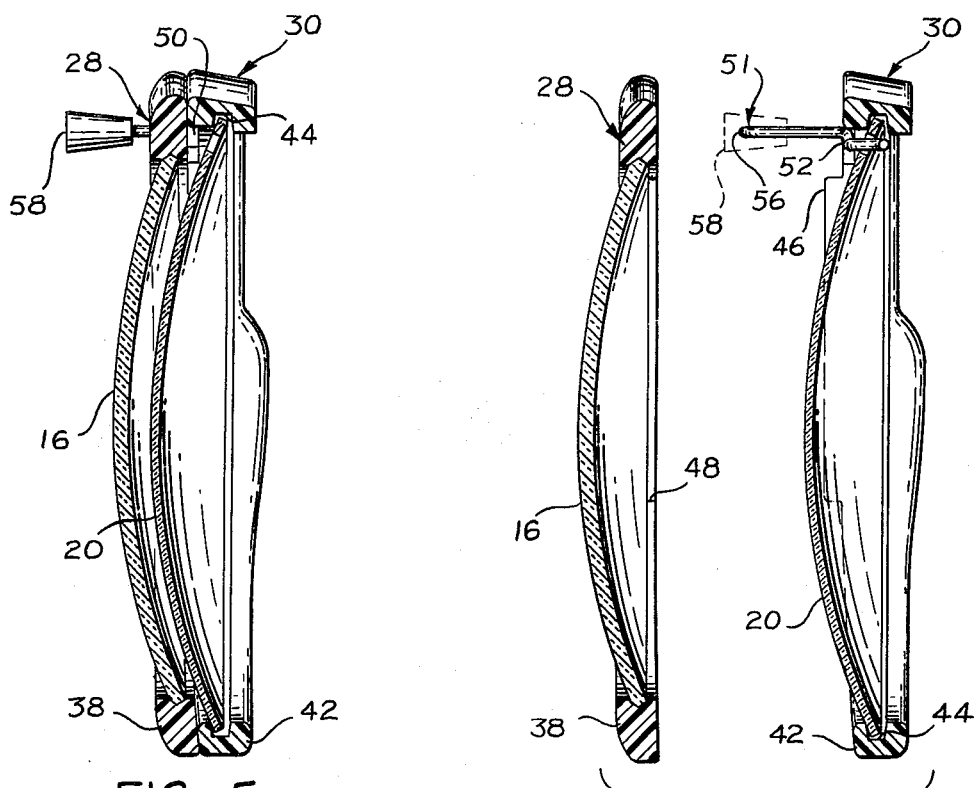
FIG. 5 is an enlarged cross-sectional view taken generally along line 5—5 of FIG. 3.

Extending generally transversely across the bridge portion of frame section 30 is recess 50 which communicates with each of lens grooves 44 for receiving lens rotation mechanism 51 which is best illustrated in FIG. 4.

This lens rotating mechanism comprises a wire 52 having its opposite ends extended through openings 54 in lenses 18 and 20. Intermediately of the extension of wire 52 between openings 54 in lenses 18 and 20, it is provided with a forwardly directed operating handle 56 produced, in the particular illustrated embodiment of the invention, by forward and reverse bending of the wire. Handle 56 may, alternatively, comprise a separate piece of wire soldered to wire 52 and extended right-angularly therefrom.

Operating handle 56 is adapted to receive knob 58 (FIGS. 1, 3 and 7) which, in the completely assembled relationship of parts of spectacles 10, facilitates manual operation of the rear lens rotating mechanism. Operating knob 58 may be manually press-fitted and selectively removable from operating handle 56 if desired for ease of disassembly of frame front 12. The extensions of wire 52 at opposite sides of handle 56 are universally laterally flexible and thus permit free and smooth movement thereof across the face-forming bend in the bridge portion of frame front 12 so as to provide for ease of operation of handle 56 and continuous accuracy of duplication of angular rotation of lenses 18 and 20.

Referring more particularly to FIGS. 1, 2 and 4, it will be seen that openings 54 and lenses 18 and 20 are so positioned as to dispose the axes of polarization 60 of these lenses horizontally and parallel to axes 40 of lenses 14 and 16 when handle 56 and knob 58 of the lens rotating mechanism is at one extreme of a path of its travel across frame front 12. This path of travel is along slot 62 in the assembly of forward and rear sections 28 and 30 of frame front 12 (FIG. 1). In the illustrated position of handle 56 and knob 58, maximum transmission of light is permitted through corresponding pairs or systems 14–18 and 16–20 of the spectacles 10 lenses.

The extent of travel permitted of handle 56 and knob 58 (e.g. in the direction of arrow 64 (FIGS. 4 and 3) is such as to effect a maximum of approximately 30° of rotation of the axes of polarization of lenses 18 and 20, i.e. to the position illustrated by dot-dash outline 60' in FIGS. 2 and 4. At this latter position of orientation of lenses 18 and 20, a desired maximum density of each of lens systems 14–18 and 16–20 is accomplished equally. It should be understood that this 30° extent of rotation of lenses 18 and 20 may be increased or decreased if desired. Also, it should be understood that openings 54 in lenses 18 and 20 may be so prelocated as to automatically position axes 60 of these lenses in a slight angular relationship to polarizing axes 40 of lenses 14 and 16 when handle 56 and knob 58 are at the afore-mentioned extreme or starting position shown in FIGS. 1, 3, 4 and 7. This would offer an adjustment to an even greater density in cases where maximum transmittance (least density) is not paramount. Alternatively, such an arrangement may be employed to lessen the extent of travel of handle 56 and knob 58 necessary for accomplishing a variable density effect in cases where the absolute minimum density afforded by an exact parallel relationship of polarizing axes 60 and 40 is not required or desired.

From the foregoing description, it can be seen that by releasing fastener 32, the forward section 28 of spectacles 10 may be readily and simply removed for cleaning or replacement of any one or more of lenses 14, 16, 18 and 20. Such a removal of section 28 leaves all remaining components of spectacles 10 intact and spectacles 10 easily reassembled.

I claim:

1. In polarizing spectacles having a frame front comprising a pair of right and left eye variable density dual lens systems, a nose engaging bridge portion and rearwardly directed temples for supporting the spectacles before the eyes of a wearer, the improvement comprising:

said frame front including readily separable juxtapositioned forward and rear lens supporting sections each having a pair of lens rims interconnected by a bridge portion for supporting right and left eye light-polarizing lenses, said sections being correspondingly face-formed by a bend in said bridge portions;

means for releasably fastening said lens supporting sections together;

a first of said sections of said frame front fixedly supporting a first right and a first left eye light-polarizing lens, said first right and left eye lenses having their respective axes of polarization aligned in a common direction;

the second of said sections of said frame front supporting a second right and a second left eye lens each juxtapositioned with a corresponding one of said first right and first left eye lenses when said sections are fastened together, said second lenses being rotatable within said rims of said second section; and manually operable universally flexible lens actuating means extending across said spectacles around said bend in said bridge portions and interconnecting said second right and left eye lenses, said actuating means having a handle intermediately of its connection to said second lenses for manually selectively effecting lateral movement thereof to simultaneously equally rotate said second lenses relative to said first lenses and thereby simultaneously identically vary the density to light of said right and left eye dual lens systems, said flexibility of said lens actuating means lending it readily conformable in shape to said face-form bend of said frame front throughout all ranges of said manual movement whereby said second right and left eye lens rotation may be effected smoothly, with ease with accurate duplication of the extent of rotation of each of said second lenses to afford accurate duplication of optical density of said right and left eye dual lens systems at all times.

2. The improvement in polarizing spectacles according to claim 1 wherein each lens of each of said dual lens systems is meniscus.

3. The improvement in polarizing spectacles according to claim 1 wherein portions of said lens actuating means extending from each side of said handle are formed of wire.

4. The improvement in polarizing spectacles according to claim 1 wherein said lens actuating means is formed of a continuous length of wire, said handle thereof being a right-angularly and reversely bent section of said wire intermediately of its opposite ends.

5. The improvement in polarizing spectacles according to claim 3 wherein ends of said extensions of said lens actuating means are pivotally fastened to said second lenses.

6. The improvement in polarizing spectacles according to claim 5 wherein said second lenses are each provided with an opening adjacent its periphery and said ends of said actuating means are directed through said openings to effect said pivotal fastening.

7. The improvement in polarizing spectacles according to claim 4 wherein opposite ends of said wire are pivotally fastened to said second lenses.

8. The improvement in polarizing spectacles according to claim 7 wherein said second lenses are each provided with an opening adjacent its periphery and said opposite ends of said wire are directed through said openings to effect said pivotal fastening.

* * * * *